United States Patent
Drory et al.

(10) Patent No.: US 7,945,569 B2
(45) Date of Patent: May 17, 2011

(54) METHOD AND APPARATUS FOR QUERYING SPATIAL DATA

(75) Inventors: Tal Drory, Haifa (IL); Amir Bar-Or, Haifa (IL); Nitzan Peleg, Haifa (IL); David Konopnicki, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1778 days.

(21) Appl. No.: 10/814,579

(22) Filed: Mar. 31, 2004

(65) Prior Publication Data
US 2005/0222978 A1  Oct. 6, 2005

(51) Int. Cl.
*G06F 7/00* (2006.01)
*G06F 17/30* (2006.01)

(52) U.S. Cl. ........................ 707/743; 707/723

(58) Field of Classification Search .......... 707/3, 103 R, 707/723, 743
See application file for complete search history.

(56) References Cited

U.S. PATENT DOCUMENTS

| | | | |
|---|---|---|---|
| 6,223,182 B1* | 4/2001 | Agarwal et al. | 707/102 |
| 6,363,392 B1* | 3/2002 | Halstead et al. | 707/102 |
| 6,684,219 B1* | 1/2004 | Shaw et al. | 707/103 R |
| 6,711,560 B2 | 3/2004 | Levy et al. | |
| 6,920,446 B1* | 7/2005 | Wang et al. | 707/2 |
| 7,080,065 B1* | 7/2006 | Kothuri et al. | 707/3 |

OTHER PUBLICATIONS

Aref, et al., "A Window Retrieval Algorithm for Spatial Databases Using Quadtrees,".
Samet, Hanan, "Spatial Data Structures," pp. 1-20, 1995.
RSV, "Spatial Access Methods," pp. 1-99, Oct. 12, 1999.
U.S. Appl. No. 10/690,762, filed Oct. 22, 2003, Peleg et al.
U.S. Appl. No. 10/691,175, filed Oct. 22, 2003, Peleg et al.
U.S. Appl. No. 10/403,500, filed Mar. 31, 2003, Peleg et al.
U.S. Appl. No. 10/403,499, filed Mar. 31, 2003, Peleg et al.

* cited by examiner

*Primary Examiner* — Apu M Mofiz
*Assistant Examiner* — Chelcie Daye

(57) ABSTRACT

The disclosed embodiments relate to an apparatus for performing query operations. The apparatus comprises a base table having spatial objects, an index table having data entries that are associated with the spatial objects. A module that is adapted to perform the query operation is configured to convert a query window into values, create a scan range for each of the values with a begin range value, an end range value, and a stop condition, scan the data entries for each of the scan range to identify one of the end range value and the stop condition, and return a result based upon the data entries that are within the scan range for each of the values.

23 Claims, 4 Drawing Sheets

US 7,945,569 B2

METHOD AND APPARATUS FOR QUERYING SPATIAL DATA

BACKGROUND OF THE RELATED ART

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Modern computer databases may store immense amounts of data. This data is typically stored in one or more tables that comprise the database. If a database contains large amounts of data, it may take a relatively long time to perform a query to retrieve data of interest to a user. The time required for a database to respond to a query may have an adverse impact on the performance of the database as a whole. If the database is subject to a large number of complex queries, the response time for each query may be seriously lengthened.

When the database includes spatial data in a base table, an index of the spatial data may be created and referred to as a "spatial index table." Spatial data is any data with a location component, which represents the location characteristics of objects in relation to space, such as latitude and longitude. This index table may actually be stored as a separate table within the database. Queries may then be run against the spatial index table without incurring processing time penalties for reassembling the information contained in the spatial index table each time a query that may be satisfied by the spatial index table is performed.

To provide the spatial data, query operations may be performed to access the spatial index table. The query operations may scan the spatial index table to determine the spatial data in the underlying base tables that is relevant to the query operation. The query operations may be defined by a query window that defines a spatial area of interest to be searched. The query operations may utilize special logic or algorithms to utilize the query window on the spatial index table.

In a complex database environment, the query window may be inefficient because the query window may be large or small in relation to the data within the spatial index table. Accordingly, the query operations may be inefficient and slower for certain query windows. The inefficiency may be a result of redundant input and output operations performed on the spatial index table and produces redundant data from the spatial index table. This means that the query operation performs more input/output operations than is necessary.

BRIEF DESCRIPTION OF THE DRAWINGS

Advantages of one or more disclosed embodiments may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
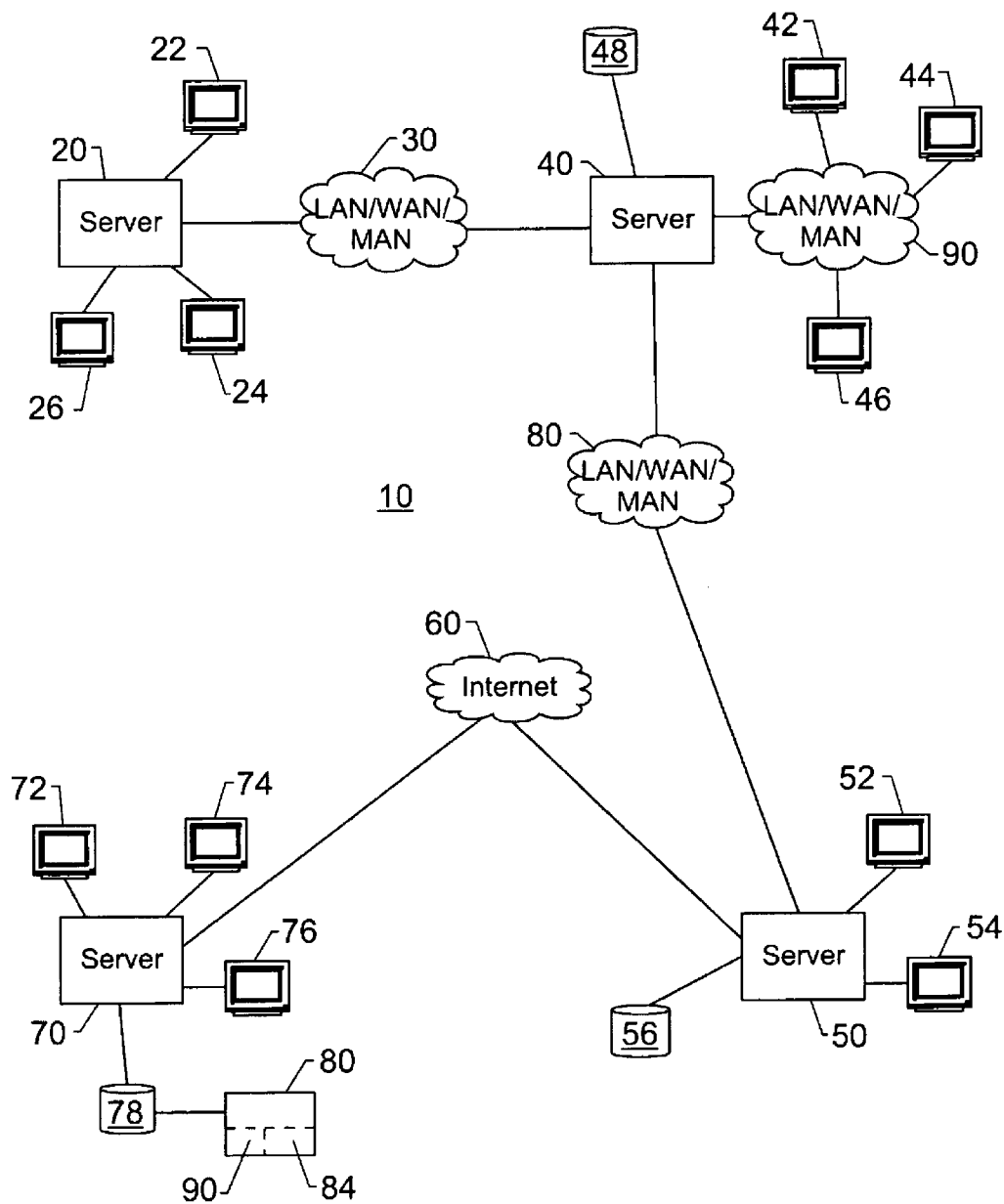
FIG. 1 is a block diagram illustrating a computer network in accordance with embodiments of the present invention.

Turning now to the drawings and referring initially to FIG. 1, a block diagram of a computer network architecture is illustrated and designated using a reference numeral 10. A server 20 may be connected to a plurality of client computers 22, 24 and 26. The server 20 may be connected to as many as "n" different client computers. Each client computer in the network 10 may be a functional client computer. The magnitude of "n" may be a function of the computing power or capacity of the server 20. The computing power or capacity of the server 20 may be a function of many design factors such as the number and speed of processors and/or the size of the system memory, for example.

The server 20 may be connected via a network infrastructure 30, which may include any combination of hubs, switches, routers, and the like. While the network infrastructure 30 is illustrated as being either a local area network ("LAN"), storage area network ("SAN") a wide area network ("WAN") or a metropolitan area network ("MAN"), those skilled in the art will appreciate that the network infrastructure 30 may assume other forms or may even provide network connectivity through the Internet. As described below, the network 10 may include other servers, which may be dispersed geographically with respect to each other to support client computers in other locations.

The network infrastructure 30 may connect the server 20 to server 40, which may be representative of any other server in the network environment of server 20. The server 40 may be connected to a plurality of client computers 42, 44, and 46. As illustrated in FIG. 1, a network infrastructure 90, which may include a LAN, a WAN, a MAN or other network configuration, may be used to connect the client computers 42, 44 and 46 to the server 40. A storage device 48 such as a hard drive, storage area network ("SAN"), RAID array or the like may be attached to the server 40. The storage device 48 may be used to store a database or portion of a database for use by other network resources. Portions or partitions of a single database may be stored on various different storage devices within the network 10.

The server 40 may additionally be connected to server 50, which may be connected to client computers 52 and 54. A network infrastructure 80, which may include a LAN, a WAN, a MAN or other network configuration, which may be used to connect the client computers 52, 54 to the server 50. The number of client computers connected to the servers 40 and 50 may depend on the capacity of the servers 40 and 50 to process information. A storage device 56 such as a hard drive, storage area network ("SAN"), RAID array or the like may be attached to the server 50. The storage device 56 may be used to store a database or portion of a database for use by other network resources.

The server 50 may additionally be connected to the Internet 60, which may be connected to a server 70. The server 70 may be connected to a plurality of client computers 72, 74 and 76. The server 70 may be connected to as many client computers as its computing power may allow. A storage device 78 such as a hard drive, storage area network ("SAN"), RAID array or the like may be attached to the server 40. The storage device 78 may be used to store a database 80 or portion of a database for use by other network resources. The database 80 may comprise a spatial index table 90 (shown in dashed lines) and a base table 84 (shown in dashed lines). Those of ordinary skill in the art will appreciate that other storage devices in the network 10 may store databases, which may include spatial index tables.

The use of databases in a networked computing environment is an important tool in a modern business environment. A database may be described as a collection of related records or tuples of information or spatial data that is represented as spatial objects. The data within the database may include spatial data with a location component. The location component may represent the location characteristics of objects in relation to the space in which the location component exist. For example, spatial data includes road maps, which contain points, lines, and polygons that represent the location of a city, roads, and the like. In this example, the global positioning data indicating the earth location (e.g., latitude and longitude) of objects may comprise spatial data. Also, the database may include operators and functions designed to efficiently access and analyze the spatial data along with other non-spatial data. Accordingly, the database may include spatial operators or functions, such as spatial queries, joins, and spatial indexing mechanisms, which are discussed below with reference to FIG. 2.

Figure 2:
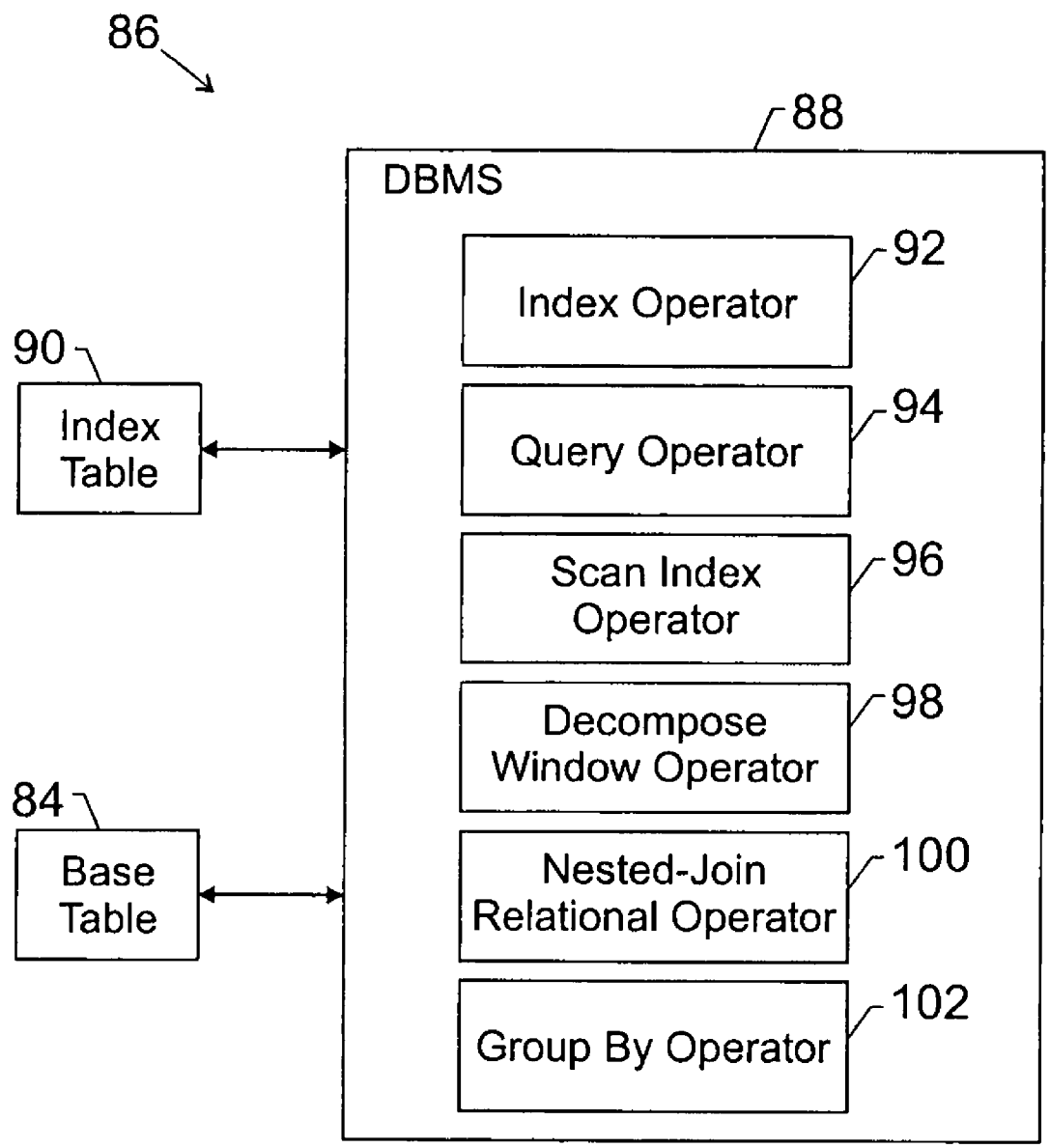
FIG. 2 is a block diagram illustrating an exemplary database in accordance with embodiments of the present invention.

FIG. 2 is a block diagram illustrating an exemplary database in accordance with embodiments of the present invention. The reference numeral 86 refers generally to the elements shown in FIG. 2. The network architecture 10 (FIG. 1) may include a module, such as a database management system ("DBMS") 88, that is adapted to create a spatial index table 90. The DBMS 88 may control the database, which may be a structured query language ("SQL") database. The DBMS may include operators 92-102 that create and utilize the index table 90 to efficiently query the spatial data in the base table 84. The DBMS 88 may also provide access to the base table 84, which may include spatial data, for the other operators 92-102, which are discussed below.

To perform efficient queries of the spatial data in the base table 84, the index operator 92 may be utilized to create the index table 90, which may be stored on one or more of the storage devices 48, 56 and/or 78 of the network architecture 10 (FIG. 1). The index operator 92 may utilized various types of indexing, such as the Grid, R-tree, QuadTree, and/or a Polygon Map Region ("PMR") QuadTree index, to create the index table 90. For instance, the PMR QuadTree index uses the approximation spatial indexing approach to represent spatial objects or data in a base table 84 by the approximation of the spatial objects in the index table 90. This allows query operations and other operators 94-102 to access the index table 90 to efficiently access spatial data from the base table 84 based on spatial logical predicates (e.g., intersect with another spatial object). As a result, the index operator 92 may create the index table 90 that may be utilized to improve the efficiency of query operations.

The DBMS 88 may also include other operators, such as a query operator 94, a scan index operator 96, a decompose window operator 98, a nested-join relational operator 100, and/or a GroupBy operator 102. The query operator 94 may be utilized to receive and indicate a specific query operation of the spatial data in the base table 84 to the other operators 96-102. The query of the spatial data may take the form of a query window, which is discussed below. The scan index operator 96 may scan the index table 90, while the decompose window operator 98 may transform the query window into index identifiers based on the index operator 92, which may be Z-values that are discussed below. The nested-join relational operator 100 combines the tables or values into a single table from the different operators 96, 98 and 102, while the GroupBy operator 102 removes any duplicate information from the query operations. Each of the operators 94-102 may be implemented as a software program, such as a routine within the DBMS 88, or may be implemented as a combination or hardware and software components, as well. Through the use of these operators 94-102, query operations may be performed on the index table 90 that is associated with spatial data in the base table 84.

The nested-join relational operator 100 may be an exemplary embodiment of a logical join operator that may be implemented to perform window queries and the spatial joins. The nested-join relational operator 100 is one implementation of the logical join as a nested-join operator. The operation of the nested-join relational operator 100 is further described below in FIG. 4 along with the other operators 94-98 and 102. The query operations may be performed in a more efficient manner through the use of Z values, which is discussed below in FIG. 3.

Figure 3:
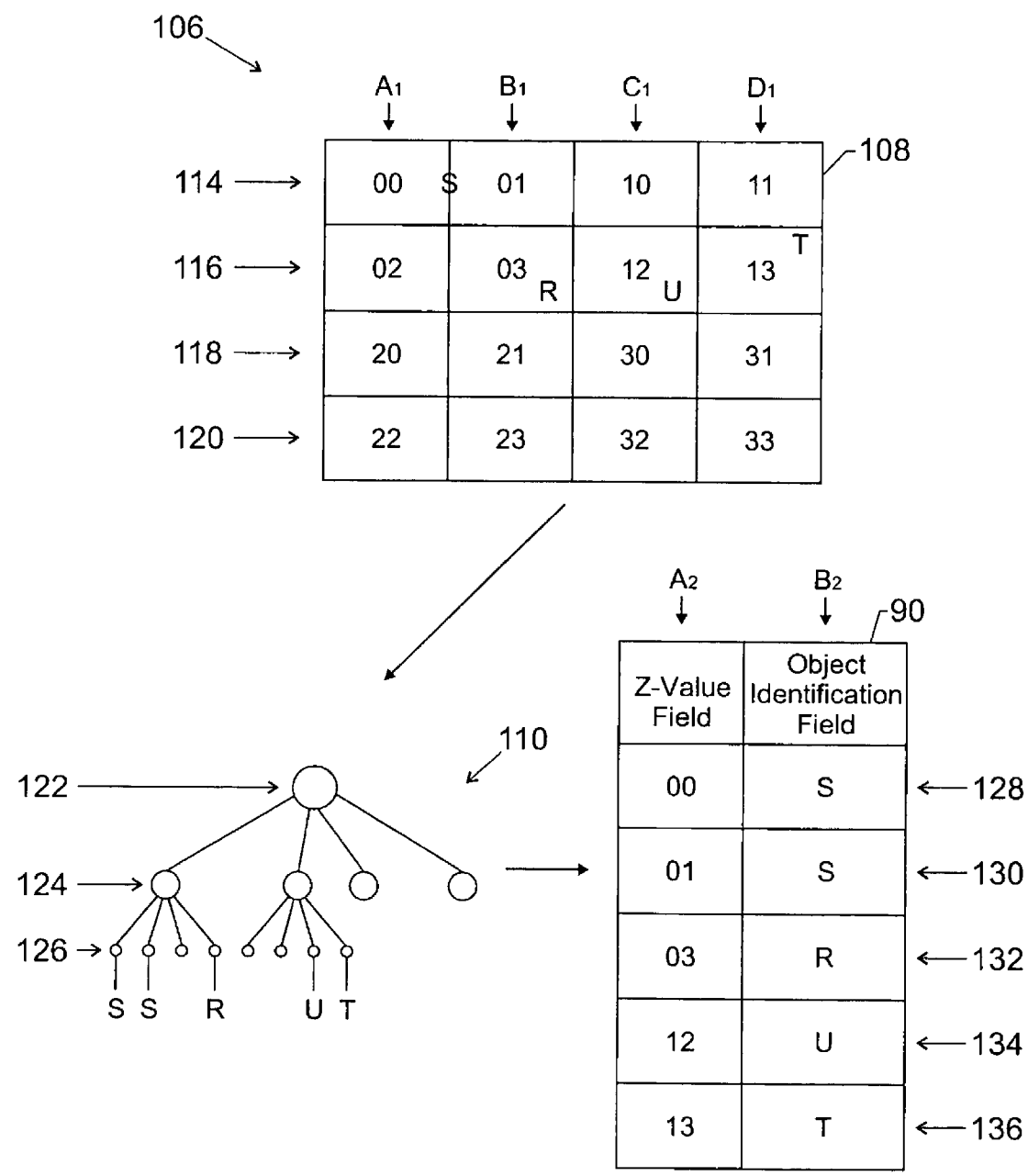
FIG. 3 is a block diagram illustrating the implementation of Z-values in an exemplary embodiment of a spatial index associated with an exemplary base table in accordance with embodiments of the present invention.

FIG. 3 is a block diagram illustrating an exemplary implementation of Z-values in a spatial index associated with an exemplary base table in accordance with embodiments of the present invention. The reference numeral 106 refers generally to the elements shown in FIG. 3. If the spatial data of base table 84 utilizes the index operator 92, which is a Polygon Map Region ("PMR") QuadTree index operator, then the representation of spatial objects R-U may be shown through a PMR tile structure 108 along with an associated PMR Quadtree 110 and an embodiment of the index table 90. Through the relationships between the PMR tile structure 108, the PMR Quadtree 110, and the index table 90, Z-values may be utilized to represent the spatial objects R-U. The Z-values are the value of the tiles $114A_1$-$120D_1$ associated with a specific region of the PMR tile structure 108. It should be noted that the embodiments of the PMR tile structure 108, the PMR Quadtree 110, and the index table 90 is for explanatory purposes.

In the PMR tile structure 108, spatial objects R-U are approximated by the intersection with tiles $114A_1$-$120D_1$. The PMR tile structure 108 is a spatial data structure based on a disjoint decomposition of the space into tiles $114A_1$-$120D_1$, which are label with the values "0-3." Each tile $114A_1$-$120D_1$ is a square with a side length of a power of 2, and may be further decomposed into 4 equal sub-tiles. Accordingly, when the objects within the tile exceed a PMR threshold attribute, which is a density adaptive index, the tile $114A_1$-$120D_1$ may be further divided into sub-tiles. Through this division of tiles, spatial objects R-U may be represented by as Z-values, which serve as the key to the index table 90. The Z-value may comprise a Morton block code that serves as the key to the index table 90. The Z-values may be obtained by bit interleaving the coordinate values of the tile $114A_1$-$120D_1$ to provide a mapping from the two-dimensional space of the tiles into a one-dimensional scalar, which is the Z-value. This allows the spatial object R-U to be efficiently indexed in the index table 90.

In the PMR tile structure 108, each of the tiles 114A$_1$-120D$_1$, which is represented by Z-values that include two digits in the range of "0-3," may be associated with other tiles to represent a larger tile. The larger tile may be formed from grouping four tiles 114A$_1$-120D$_1$ that have the same first digit in the Z-values, which is referred to as a prefix value. For example, the tiles 114A$_1$, 114B$_1$, 116A$_1$ and 116B$_1$ may be sub-tiles of a larger tile with the Z-value of "0," which is the prefix of the Z-values for the tiles 114A$_1$, 114B$_1$, 116A$_1$ and 116B$_1$. Accordingly, the tile 114A$_1$ may have a Z-value of "00," the tile 114B$_1$ may have a Z-value of "01," the tile 116A may have a Z-value of "02," and the tile 116B$_1$ may have a Z-value of "03." Similarly, the tiles 114C$_1$, 114D$_1$, 116C$_1$ and 116D$_1$ may be the sub-tiles of a larger tile with the Z-value of "1." Accordingly, the tile 114C$_1$ may have a Z-value of "10," the tile 114D$_1$ may have a Z-value of "11," the tile 116C$_1$ may have a Z-value of "12," and the tile 116D$_1$ may have a Z-value of "13." The other tiles 118A$_1$-120D$_1$ may be grouped in a similar manner. Accordingly, through this division of tiles, spatial objects R-U may be represented by as Z-values that are shown in the PMR Quadtree 110.

The PMR Quadtree 110 may be a data tree structure that is formed from the Z-values associated with the tiles 114A$_1$-120D$_1$. The PMR Quadtree 110 may be a layered data structure that includes four branches or leaves on each level to represent the Z-value of the tile and the associated sub-tiles. The PMR Quadtree 110 may include many different levels with each level having four leaves per node in the previous level. The PMR tile structure 108 may be represented by the base level 122, while the first level 124 represents the large tiles that include the grouping of four tiles, such as tiles 114A$_1$, 114B$_1$, 116A$_1$ and 116B$_1$ or tiles 114C$_1$, 114D$_1$, 116C$_1$ and 116D$_1$, for example. The second level 126 may represent the individual tiles 114A$_1$-120D$_1$ with the associated Z-values and spatial objects R-U. From the levels 122-126 of the PMR Quadtree 110, the spatial objects R-U and the associated Z-values of the tiles 114A$_1$-120D$_1$ may be represented. For instance, the spatial object R may be represented by the Z-value of "03," which is on the second level 126 and connected to the four node of the first level node, while the spatial object S may be represented by the Z-values of "00" and "01," which are also on the second level 126 and connected to the first and second nodes, respectively. From the PMR Quadtree 110, the Z-values associated with the spatial objects R-U may be associated with entries 128-136 in the index table 90. For example, entry 134 represents a portion of the R-U object in index table 90.

The index table 90 may include various entries 128-136 that represent the spatial objects R-U in relation to the tiles 114A$_1$-120D$_1$. The index table 90 may include a Z-value field A$_2$ and an object identification field B$_2$. The Z-value field A$_2$ may include the Z-value for the respective entries 128-136 in the index table 90, while the object identification field B2 may include the object identification ("OID") for the spatial object R-U. For example, the spatial object R may be represented as entry 132, which has a Z-value of "03" and OID of "R." Similarly, the spatial object S may be represented by the entry 128, which has a Z-value of "00" and OID of "S," and the entry 130, which has a Z-value of "01" and OID of "S." Accordingly, the spatial objects R-U in the PMR tile structure 108 may be represented in the index table 90 through various entries 128-136 with the Z-value field A$_2$ and the object identification field B$_2$.

Accordingly, the use of the Z-values provides an efficient spatial identifier that may be utilized to efficiently perform query operations. In the index table 90, the Z-value may be a base-4 digits string or a bitmap where each base-4 digit is represented by 2 bits. Similarly, the Z-values may be represented in a computer readable format as a variable length value or as a fixed length value, which may include any number of bytes based upon implementation considerations. With the fixed length representation of the Z-value, additional level information may be included because the bitmap may be filled with zeros and the level may not be ascertained. For instance, for the Z-value of "020" in level 3 and the "02" in level 2, the Z-values are represented in the bitmap "001000." An additional level data of level 3 or level 2 is utilized to further define these Z-values. In this configuration, the Z-value may be referenced by a 9 bytes bitmap representation, in which the 8 most significant bytes represent the Z-value for a specific tile 114A$_1$-120D$_1$, and the $9^{th}$ least significant byte represents the level, which may be from 1-32. Accordingly, the index table key may be the 9 bytes Z-value, which is located in the Z-value field, and followed by a reference OID to the base table 84 row for the spatial object. However, any number of the bytes may be utilized to represent the Z-value along with an identifier that represents the level information. With the spatial objects R-U represented in the index table 90, query operations may be performed on the index table 90, which is discussed below in FIG. 4.

Figure 4:
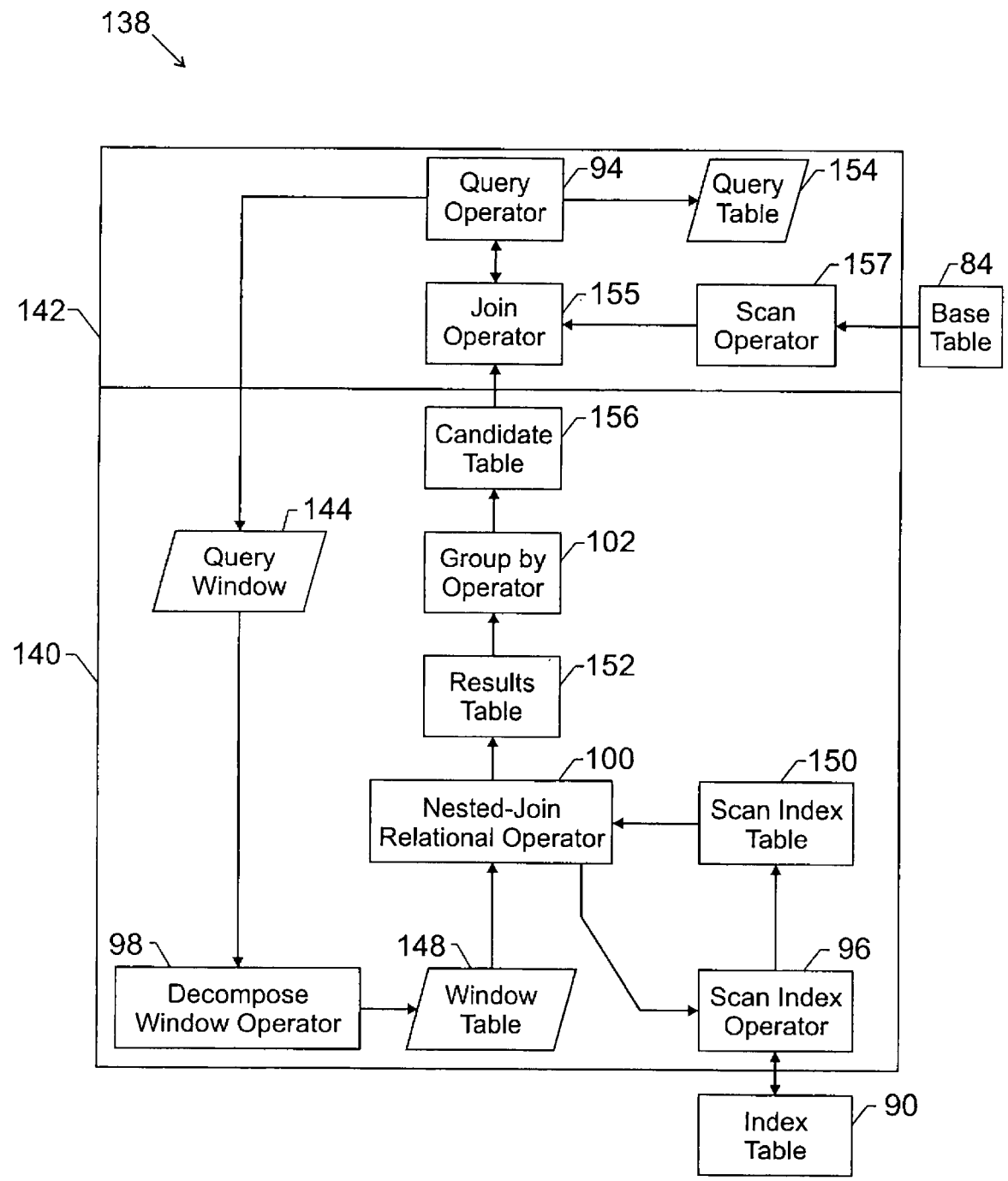
FIG. 4 is a block diagram illustrating an exemplary flow of a query operation that may be implemented in embodiments of the present invention.

FIG. 4 is a block diagram illustrating an exemplary flow of a query operation that may be implemented in embodiments of the present invention. The reference numeral 138 refers generally to the elements shown in FIG. 4. To perform a query operation on the spatial data in the base table 84 or the index table 90, the query operation may be divided into two modules, such as a filter module 140 and a refinement module 142. The filter module 140 may be utilized decompose the query window into Z-values and scan the index table 90 to provide results, such as a candidate table 156 or results table 152, to the refinement module 142, which utilizes computational geometry to verify the results against the query window 144.

In the filter module 140, the query window 144 is decomposed into non-intersecting Z-values and referenced against the index table 90. The query window 144 may describe a spatial area of interest (e.g., a circle, square, or other polygon), which may include roads, streets, cities, and/or other geographical locations. The spatial area may encompass the spatial objects that intersect with the spatial area or are within the spatial area defined by the query window 144. The query window 144 is decomposed at the decompose window operator 98 into a window table 148 that contains a list of Z-values that represent the query window 144. The window table 148 is provided to a join operator, such as a nested-join relational operator 100. The scan index operator 96 scans the index table 90 to form a scan index table 150 that is also provided to the nested-join relational operator 100. The nested-join relational operator 100 may provide the Z-values or may provide a scan range for each of the Z-value in the window table 148 to the scan index operator 96. The nested-join relational operator 100 may perform operations to determine pairs of Z-value equivalent entries from the window table 148 and the scan index table 150. From the operations, the nested-join relational operator 100 produces a result, such as entries in the results table 152 or a list of OIDs. The result includes candidate objects that may satisfy the spatial relationship of the query window 144. The results table 152 may be provided to a GroupBy operator 102 or directly to the join operator 155. The GroupBy operator 102 may create a candidate table 156 by removing duplicate entries from the results table 152. The GroupBy operator 102 may provide candidate table 156 to the join operator 155 in the refinement module 142.

In the refinement module 142, the candidate table 156 is received for further processing. The refinement module 142 utilizes computational geometry to produce a query table 154 that includes the OIDs that satisfy the relationship indicated in the query window 144. The scan operator 157 may access the base table 84 and scan the base table 84 for spatial objects. The join operator 155 combines the spatial objects from the scan operator 157 with the candidate table 156. The query operator 94 utilizes the table from the join operator 155 to check through computational geometry spatial relationships between the spatial objects and the query window 144. Accordingly, the query table 154 may be provided to a user or stored into within the database.

Alternatively, it should be noted that spatial join query between the two spatial index tables, such as the index table 90, may be performed by the filter module 140 and the refinement module 142. With a spatial join query, the window table 148 may include entries that have a Z-value or identifier field, such as the Z-value field $A_2$ that includes a Z-value and an object identification field, such as the object identification field $B_2$ that includes OIDs. In this situation, the results table 152 may include entries that are a pair of OIDs from the window table 148 and scan index table 150. The results table 152 may be further processed as discussed above.

The nested-join relational operator 100 may join the window table 148 and the scan index table 140 based upon the Z-value equivalence between the entries, such as entries 128-136 (FIG. 3), in the Z-value fields of the window table 148 and the scan index table 150. A first entry may be Z-value equivalent to a second entry if one of the entries is a prefix of the other entry. For example, if the first entry has a Z-value of "01" and the second entry has a Z-value of "0123," then the entries are Z-values equivalent because "01" is a prefix of "0123." Accordingly, the second entry is contained in first entry, which means that the tile corresponding to the second entry is within the tile corresponding to the first entry.

Because no pre-existing knowledge of the Z-value equivalents exists in the index table 90, it may be assumed that the level of Z-values in the window table 148 may be bigger or smaller than the levels of Z-values in the index table 90. This may result in the issuing of a single very inefficient range operation, or utilizing multiple scans to return the Z-value equivalents from the entries of the index table 90. Accordingly, for a given entry in a window table 148 having a Z-value of "Zw," finding the matching Z-value equivalents in the index table 90 may not return the correct values if scan range created is from the Z-value Zw padded with "0's" to the Z-value Zw padded with "3's." For instance, if the Z-value Zw equals "01" and the index table 90 contains the entries having Z-values of "002," "0101," "012," "013," "0201," "0202," and "03," then the scan range may be created from the Z-value Zw, which may be the Z-values from "01000" to "01333." With this scan range, three Z-value equivalents may be returned. Conversely, if the Z-value Zw is at a more detailed level than the entries in the index table 90, then a single range constructed from Zw's first digit, which may result in many entries being returned from the index table 90 that are non-Z-value equivalents. For instance, if the Z-value Zw is "02023" and the index table 90 contains the entries having the Z-value of "002," "0101," "012," "013," "0201," "0202," and "03," then the scan range may include the Z-value from "00000" to "03333." With this scan range, seven Z-value equivalents may be returned from the index table 90 with six of the entries not being Z-value equivalents. This results in inefficient operations because of the input/output operations that are utilized to retrieve these additional entries.

To improve the efficiency of the query operation, the nested-join relational operator 100 may utilize two mechanisms to enhanced performance. The first mechanism or extension is the Z-value equivalent stop predicate, which is discussed below. This extension reduces each right scan range to limit the scan range for retrieving the right Z-value equivalent entries in the index table 90 by utilizing a stop condition to limit the entries scanned. The second mechanism or extension is the "skip" operation, which is discussed following the first mechanism. This extension allows the decomposition level of the query window 144 to be detailed, without excessive scans of the index table 90 when the query window 144 is at a more detailed level than the entries of the index table 90 or when the index table 90 may not return any Z-value equivalents. Further, the skip mechanism reduces redundant input/output ("I/O") operations because the decomposition of the query window 144 may avoid gaps in the index table 90. Accordingly, these mechanisms or extensions may enhance the operation of the system by improving the query operations.

In utilizing the Z-value equivalent stop predicate in the nested-join relational operator 100, the query operation may be more efficient because the scanning of non Z-value equivalent entries may be eliminated. The nested-join relational operator 100 may utilize a single Z-value to create a single and efficient range operation that is issued for any entry in the window table 148. The scan range may be determined by: (i) exploiting the PMR attributes to set a specific scan range, and (ii) extending the nested-join relational operator 100 by adding a stop-condition, which is evaluated for each Z-value scan in the index table 90. This stops the range operation as soon as a non Z-value equivalent entry is scanned in the index table 90. As a result, the single scan operation may limit the scanning of the entries of the index table 90 to Z-value equivalents, which improves the efficiency of the nested-join relational operator 100.

The nested-join relational operator 100 with Z-value equivalent stop predicate operates in a more efficient manner. For each Z-value Zw in the window table 148, which may be referred to as the left Z-value, the nested-join relational operator 100 scans, in descending order, the entries of the index table 90, which may be referenced as the right Z-values, using a scan range. The scan range may have a begin-range value of Zw3, where Zw3=Zw padded with "3s" to a specified level. The scan range may have an end-range value that is the level-1 Z-value (i.e. the prefix in length 1 of Zw or level 1 of Zw). The scan range operates by scanning the Z-value of the entries in the index table 90 that have a Z-value less than begin-range value Zw3. Further, the scan range may include a stop condition that stops the scan operation when the Z-value for an entry in the index table 90 is not Z-value equivalent to Z-value Zw in the window table 148. As a result, the use of the Z-value stop predicate with the nested-join relational operator 100 increases the efficiency of queries operations by reducing the number of index table 90 scans through the reduction of the actual scan range that retrieves the Z-value equivalents in the index table 90. Thus, the stop condition further enhances the operation because the stop condition ends the scan operation when an entry in the index table 90 reaches a non-Z-value equivalent.

For instance, for a given entry in a window table 148 having a Z-value of "02023," the begin-range value is "02023333," the end-range is "0," and the stop condition stops the scan operation when the Z-value for an entry in the index table 90 is not a Z-value equivalent to "02023." The index table 90 may include the Z-values "002," "0101," "012," "013," "0201," "0202," and "03." In performing the scan operation, the nested-join relational operator 100 may start the scan operation with the first entry in the index table 90 below the begin-range, which is the entry "0202," and proceed in descending order to the end-range "0." The nested-join relational operator 100 may return "0202," and the scan operation may stop at "0201" because "0201" is not a Z-value equivalent to the "02023." As a result, the scanning operation has returned the appropriate Z-value equivalents with the minimal amount of scan operations.

Advantageously, by utilizing the nested-join relational operator 100 with the Z-value equivalent stop predicate, the accessing of the spatial data for a query operation may be performed more efficiently. The nested-join relational operator 100 with the Z-value equivalent stop predicate does not utilize special algorithms and special logic to perform the query operation on index tables. Further, the stop condition and specific range limits the scan operations of index table entries, which increases the efficiency of the query operation. That is the spatial objects retrieved are within the query window 144 because the query window 144 is decomposed into Z-values, which may be efficiently scanned and applied to the index table 90, as discussed above. Moreover, the nested-join relational operator 100 with the Z-value equivalent stop predicate limits the scans of the index table 90, which may limit the inefficiency of multiple scans.

By utilizing the skip mechanism with the nested-join relational operator 100, the query operation may be further enhanced. The nested-join relational operator 100 may utilize the skip mechanism to limit the entries of the window table 148 that return redundant entries from the index table 90. The efficiency is further enhanced because the nested-join relational operator 100 with the skip operation may skip scan operations for certain Z-value in the window table 148 that produce redundant entries in the index table 90. This improves the efficiency of the query operation.

As noted above, the window table 148 includes multiple Z-values that represent the query window 144. Accordingly, the decomposition level of the query window 144 may be too detailed relative to the Z-values in the entries of the index table 90. The decomposition levels may refer to the levels of the PMR Quadtree 110. In this situation, Z-values in the window table 148 may return the same Z-values from the index table 90, which results in redundant scan operations of the index table 90 that may be eliminated. Similarly, as also discussed above, if the decomposition level of the query window 144 is at a less detailed level than the entries of the index table 90, the entries of the window table 148 may be inefficient and return too many entries from the index table 90. Moreover, if the scan for a Z-value in the window table 148 does not return a Z-value equivalent, then subsequent scans for other Z-values may also not return Z-value equivalents, which results in unnecessary scans of the index table.

Because it is difficult to determine an appropriate decomposition level for the Z-values in the window table 148 that are efficient in view of the levels of the index table 90, the nested-join relational operator 100 may utilize the skip extension. The skip extension eliminates the problem of too detailed a decomposition level for the Z-values of the window table 148, by identifying consecutive Z-values in the window table 148 that return the same entries from the index table 90. Furthermore, the skip mechanism may identify consecutive Z-values in the window table 148 that may return no Z-value equivalents because the other Z-values in the window table 148 are between the last Z-value that returned nothing and the non Z-value equivalent in the index table 90. Accordingly, the nested-join relational operator 100 may utilize the skip extension to reduce the redundant scan operations and eliminate the associated inefficiency.

To operate the nested-join relational operator 100 with the skip extension, the operation may be divided into an initialization phase and an operation phase. The initialization phase may include defining various settings or variables may be defined. For instance, the Z-value Zw of the entry in the window table 148 may be padded with "3s" and referenced as Zw3. The Z-value of the previous entry in the window table 148 may be referenced as Zprev, while the Zprev3 is the previous Z-value padded with "3s" and the prefix of the level 1 for the previous Z-value may be referenced as Zprev1. Further, the last returned Z-value from the index table 90 may be referenced as Zlast. However, if the previous scan with the previous Z-value Zprev does not return a Z-value equivalent, then the last returned value Zlast may be include the identifier "empty" or an associated value. For the scan range, the Z-value Zstop may be the previous Z-value in the index table 90 to stop the scan operation for the previous Z-value Zprev, which is not a Z-value equivalent of the previous Z-value Zprev. However, if the previous scan operation for Z-value Zprev stopped because no entries of the index table 90 were within the range, then the Z-value Zstop may be equal to "empty" or an associated value. The Z-values Zlast, Zstop, and Zprev may be set to non-valid values at initialization and/or when a query operation is being performed.

In the operation phase, the nested-join relational operator 100 with the skip extension may apply the variables defined in the initialization phase to improve efficiency. For instance, if Zlast is not "empty," then the operation may benefit from skipping a Z-value in the window table 148 that returns the same entries from the index table 90. That is the skip operation may be executed on the Z-values of the window table 148, which return duplicate values from the index table 90. Accordingly, if Zlast is not "empty," and the Z-value Zw is contained in the Z-value Zlast, then do not scan the index table 90 and return no Z-value equivalents. However, if the Zlast is "empty," then the operation can benefit from skipping a Zvalue in the window table 148 that returns no entries that are Z-value equivalent. Accordingly, if Zlast is "empty" and if Zstop is not "empty," then the previous operation scanned at least one row of the index table 90. Hence, if Zw3<=Zprev3, Zw>Zstop, and Zw is not Z-value equivalent to Zstop, then do not scan the index table 90 and return no Z-value equivalents. Otherwise, if the Zstop is "empty," then the previous scan did not return any Z-value equivalents. Consequently, if Zw3<=Zprev3, then do not scan the index table 90 and do not return any Z-value equivalents. The operation may be presented as a routine as follows:

Operation Procedure:
  if Zlast is not "empty" (the returned right Zvalue list is not empty, we try to benefit from skipping a Zvalue in the window table 148 that would have returned the same right list);
  then execute skip-on-same-returned-list procedure;
  else (Zlast is "empty") (the returned right Zvalue list is empty, we try to benefit from skipping a Zvalue in the window table 148 that would have also returned an empty list);
  then execute skip-on-empty-returned-list procedure;
Skip-On-Same-Returned-List Procedure:
  if Zw is contained in Zlast, then do not scan the index table and return nothing;

Skip-On-Empty-Returned-List Procedure:
   if Zstop is not "empty" (the right scanned at least one row);
      if Zw3<=Zprev3 and Zw>Zstop and Zw is not Z-value equivalent to Zstop, then do not scan the index table and return nothing;
   else (Zstop is "empty") (the right scan did not scan any row of the index table);
      if Zw3<=Zprev3, then do not scan the index table and return nothing.

This section deals with a window query, where the left side includes no OIID (single window). In case of a join between two spatial indexes, as discussed above, the skip operation is allowed only inside each group of the same left object.

Accordingly, the nested-join relational operator 100 may implement the skip extension to create a modified nested-join relational operator with the skip extension, which exploits a situation where the index table 90 is a PMR index table and the nested-join relational operator 100 utilizes the Z-value equivalence, as in spatial window queries or spatial joins. This means that the nested-join relational operator 100 may implement the skip extension to skip scan operations that return redundant index table entries and empty results. Therefore, the nested-join relational operator 100 with the skip extension improves the efficiency of such query operations.

For example, a query window 144 may be decomposed into a window table 148 having the Z-values of "010" and "012." If the index table 90 has entries of "(002,A)," "(01,A)," "(01,1B)," "(01,C)," "(020,B)." The first Z-value "010" scan returns the index table entries of "(01,A)," "(01,B)," "(01,C)." Similarly, the second Z-value "012" scan returns the same entries. With the nested-join relational operator 100 with the skip extension, the skip mechanism prevents the direct and sequential input/output operations for scanning the entries of the index table for the Z-values of "012." As another example, the skip mechanism may be utilized with the Z-value equivalent stop predicate. The query window 144 may be decomposed into a window table 148 that has the Z-values of "20" and "21" and the index table 90 has entries of "(002, A)," "(01,A)," "(30, B)," "(31, C)." The first window Z-value "20" starts the scan at the begin-range value of "20333" and ends when the entry "(01,A)" is found because the Z-value "01" satisfies the stop condition. As a result, the scan operation returns no Z-value equivalents and "01" as the first non Z-value equivalent. The second Z-value "21" is guaranteed to return nothing, because it falls between the previous Z-value '30' and the right non Z-value equivalent "01." As such, the scan for the second Z-value "21" may be skipped to save the I/O operations.

Advantageously, by utilizing the nested join relational operator 100 with the skip mechanism, the accessing of the spatial data for a query operation may be performed more efficiently. The nested-join relational operator 100 with the skip mechanism may also skip scan operations that are empty or return no results, which increases the efficiency of the query operation. In addition, the skip mechanism prevents redundant input/output operations when the decomposition of the query window is at a level that is detailed relative to the index table entries and the index table 90 has gaps in specific window areas.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system for performing query operations, the system comprising:
   a base table having a plurality of spatial objects;
   an index table that comprises a plurality of data entries, the plurality of data entries being associated with the plurality of spatial objects;
   a module adapted to perform a query operation on the index table, the module configured to;
   convert a query window into a plurality of values;
   create a scan range for each of the plurality of values with a begin range value and an end range value from the plurality of values, wherein the scan range includes a stop condition;
   scan the plurality of data entries for each of the scan ranges to identify one of the end range value and the stop condition; and
   return a result based upon the plurality of data entries that are within the scan range for each of the plurality of values.

2. The system set forth in claim 1, wherein the stop condition is satisfied if one of the plurality of data entries is not Z-value equivalent to one of the plurality of values being utilized to scan the plurality of data entries.

3. The system set forth in claim 1, wherein the index table is a Polygon Map Region QuadTree index.

4. The system set forth in claim 1, wherein the plurality of data entries each comprises a Z-value field and an object identification field.

5. The system set forth in claim 4, wherein the result comprises a plurality of object identification fields that correspond to a plurality of data entries.

6. A system for performing query operations, the system comprising:
   a base table having a plurality of spatial objects;
   an index table that comprises a plurality of data entries, the plurality of data entries being associated with the plurality of spatial objects in the base table;
   a module adapted to perform a query operation on the index table, the module configured to;
   convert a query window into a plurality of values;
   perform a first scan for one of the plurality of values on the plurality of data entries;
   return a result from the first scan of the plurality of data entries;
   determine whether a second of the plurality of values may return the result with a second scan;
   skip the second scan if the second scan is determined to return the result; and
   perform the second scan if the second scan is determined not to return the result.

7. The system set forth in claim 6, wherein the plurality of values comprises a plurality of Z-values and the plurality of data entries comprise a plurality of fields, wherein one of the plurality of fields is a Z-value field.

8. The system set forth in claim 6, wherein the results comprise an empty identifier or a table having a plurality of Z-values and a plurality of object identifications.

9. The system set forth in claim 6, comprising creating a scan range for each of the plurality of values with a begin range value and an end range value from the plurality of values, wherein the scan range includes a stop condition.

10. The system set forth in claim 9, wherein the begin range value is higher than the end range value; and the module is configured to perform the first scan on the plurality of data entries in descending order.

11. A system for performing a query operation, comprising:
   means for transforming a query window into a plurality of values;
   means for creating a scan range with a begin range value, an end range value, and a stop condition for each of the plurality of values;
   means for scanning a plurality of data entries until one of the end range value and the stop condition; and
   means for returning a result based upon the plurality of data entries that are within the scan range of each of the plurality of values.

12. A method of performing a query operation, the method comprising:
   converting a query window into a plurality of values;
   defining a begin range, an end range, and a stop condition for each of the plurality of values;
   scanning a plurality of data entries until one of the end range and the stop condition; and
   returning a result based upon the plurality of data entries that are between the begin value and one of the end range and the stop condition for each of the plurality of values.

13. The method set forth in claim 12, comprising deriving an index table of the plurality of data entries from a base table of a plurality of spatial objects.

14. The method set forth in claim 12, wherein the plurality of data entries is a Polygon Map Region QuadTree index.

15. The method set forth in claim 12, wherein scanning comprises comparing each of the plurality of data entries to at least one of the plurality of values to determine if each of the plurality of data entries is Z-value equivalent to the at least one of the plurality of values.

16. The method set forth in claim 12, wherein steps of the method are performed in an order in which they are recited.

17. A method for performing query operations, the method comprising:
   converting a query window into a plurality of values;
   performing a first scan for one of the plurality of values on a plurality of data entries of an index table;
   returning a result from the first scan of the plurality of data entries in the index table;
   determining whether a second of the plurality of values may return the result with a second scan;
   skipping the second scan if the second of the plurality of values is determined to return the result; and
   performing the second scan if the second plurality of values is determined not to return the result.

18. The method set forth in claim 17, wherein the result may be one of an empty identifier or a table that comprises a Z-value field and an object identification field.

19. The method set forth in claim 17, comprising combining each of the results into a result table to be provided to a user in response to the query operation.

20. The method set forth in claim 17, wherein steps of the method are performed in an order in which they are recited.

21. A non-transitory computer-readable medium that stores machine-readable instructions computer program, comprising:
   code for generating an index table stored on the machine readable medium, the index table containing a plurality of data entries; and
   code for generating a query module stored on the machine readable medium, the query module configured to:
   convert a query window into a plurality of values;
   create a scan range for each of the plurality of values with a begin range value, an end range value, and a stop condition;
   scan the plurality of data entries until one of the end range value and the stop condition; and
   return a result based upon the plurality of data entries that are within the scan range for each of the plurality of values.

22. The non-transitory computer-readable medium set forth in claim 21, wherein the query module is further configured to return a plurality of results based upon the plurality of data entries that are within the scan range for each of the plurality of values.

23. The non-transitory computer-readable medium set forth in claim 21, wherein the plurality of data entries each comprises a Z-value field and an object identification field.

* * * * *

UNITED STATES PATENT AND TRADEMARK OFFICE
CERTIFICATE OF CORRECTION

| | | |
|---|---|---|
| PATENT NO. | : 7,945,569 B2 | |
| APPLICATION NO. | : 10/814579 | |
| DATED | : May 17, 2011 | |
| INVENTOR(S) | : Tal Drory et al. | |

It is certified that error appears in the above-identified patent and that said Letters Patent is hereby corrected as shown below:

In column 14, line 18, in Claim 21, after "instructions" delete "computer program".

Signed and Sealed this
Eighth Day of November, 2011

David J. Kappos
*Director of the United States Patent and Trademark Office*